P. KANIZSAI.
DIRT RECEPTACLE.
APPLICATION FILED MAR. 14, 1914.

1,172,534.

Patented Feb. 22, 1916.

WITNESSES
Samuel Payne
Max H. Arkins

INVENTOR
P. Kanizsai.
by Henry C. Evert
ATTORNEYS

THE COLUMBIA PLANOGRAPH CO., WASHINGTON, D. C.

UNITED STATES PATENT OFFICE.

PAUL KANIZSAI, OF CLEVELAND, OHIO.

DIRT-RECEPTACLE.

1,172,534. Specification of Letters Patent. Patented Feb. 22, 1916.

Application filed March 14, 1914. Serial No. 824,699.

*To all whom it may concern:*

Be it known that I, PAUL KANIZSAI, a subject of the King of Hungary, residing at Cleveland, in the county of Cuyahoga and State of Ohio, have invented certain new and useful Improvements in Dirt-Receptacles, of which the following is a specification, reference being had therein to the accompanying drawing.

This invention relates to a dirt receptacle, designed primarily for household use, and has for its object to provide a receptacle having a hinged cover and a handle, the handle being pivotally connected to the body of the receptacle and the cover slidably connected to the handle whereby when occasion so requires, the handle can be shifted in one direction to cause the opening of the cover.

Further objects of the invention are to provide a receptacle for the purpose set forth which is simple in its construction and arrangement, strong, conveniently handled and carried, efficient in its use, readily set up and inexpensive.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

Figure 1:
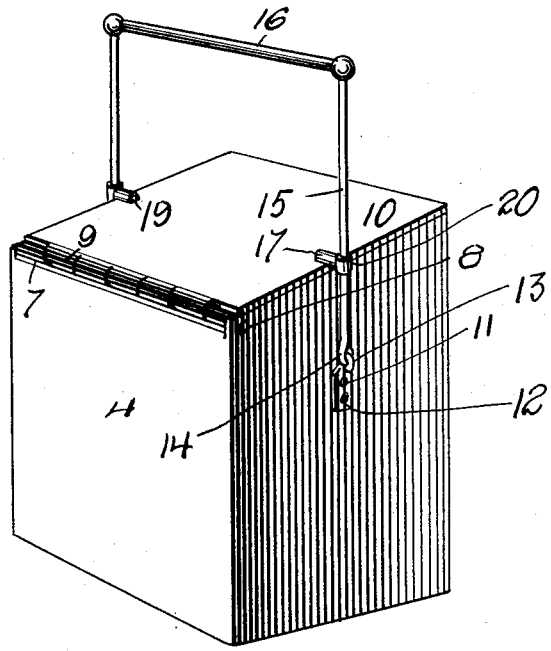
Figure 2:
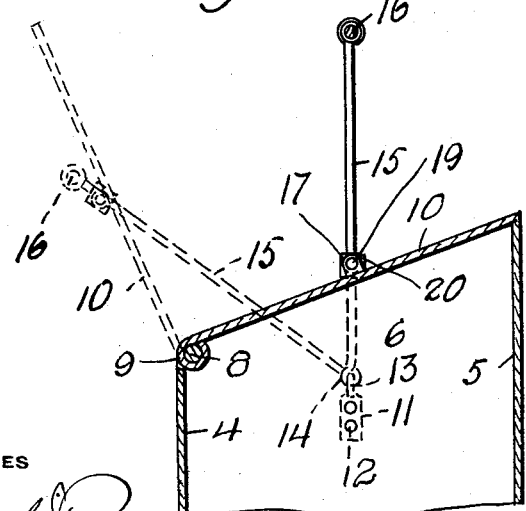
Figure 3:
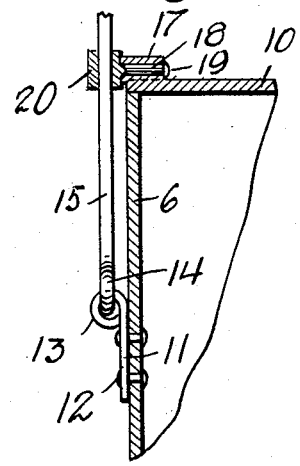

In the drawings wherein like reference characters denote corresponding parts throughout the several views: Figure 1 is a perspective view of a receptacle in accordance with this invention; Fig. 2 is a vertical sectional view, broken away; and Fig. 3 is a horizontal sectional view, broken away.

Referring to the drawings in detail the receptacle includes a body portion which is closed at its bottom and open at its top, and the said body portion has the front wall 4 thereof of less height than the rear wall 5, and has the top edge of each of its side walls 6 extending upwardly at an inclination from the front wall 4 to the rear wall 5.

The top edge of the front wall is cut away as at 7 to provide a clearance, and connected to the side wall 6 inwardly with respect to said cut away portion is a pivot rod 8, and mounted upon said rod 8 are barrels 9 formed at the front of the cover or lid 10, under such conditions the cover or lid 10 is pivotally connected with the front wall 4. The cover or lid 10 when closed, is mounted upon the top edges of the side walls 6 and rear wall 5.

Connected to each of the side walls 6, upon the outer face thereof, through the medium of hold-fast devices 11, is a plate 12, having its upper end provided with an eye 13, to which is loosely attached an eye 14, formed on the lower end of the vertical arm of the handle member. The arms 15 of the handle member are connected together by a transverse handle bar 16.

Connected to the upper face of the lid or cover 10 is a pair of sleeves 17, which are arranged opposite from each other, and each of which slightly project beyond the side edge of the lid or cover 10. Mounted in each of the sleeves 17 is a shank 18, which is upset to provide a head 19, the latter bearing against the inner end of the sleeve 17. Formed integral with the outer end of the shank 18, is a vertically disposed collar 20 through which extend the arms 15 of the handle member. The shanks 18 are loosely mounted in the sleeve 17 whereby a vertical connection is set up between the sleeve 17 and the arms 15, under such conditions when the handle member is shifted toward the front wall 4 of the receptacle, the lid 10 will be automatically opened, and when the handle member is shifted toward the rear wall 5, the lid or cover 10 will be closed. The normal position of the handle member 15 is as illustrated in Figs. 1 and 2, and is maintained in such position when the lid or cover 10 is closed. If the receptacle is carried in such a manner that the party carrying the receptacle will bear against the handle member in the direction toward the rear wall 5, the cover will be retained closed. An inspection of Fig. 2 will reveal that the necessary relationship exists between the points of intersection of the pivots 8, 19 and 13 with a given plane, namely, such that the two lines connecting the point 19 with each of the others form an acute angle.

What I claim is:—

1. A receptacle comprising a body portion, a cover hinged thereto, a handle pivotally connected to said body portion, and a connection between said cover and handle including a member mounted for movement relative to both, the relation of said connection, hinge and pivot being such that movement of the handle automatically imparts movement to the cover.

2. A receptacle comprising a body portion provided with a hinged cover, a handle member including a pair of arms pivotally connected to the outer face of the sides of said body portion, a pair of sleeves fixedly secured to the upper face of said cover, a shank pivotally mounted in each of said sleeves, and collars carried by the outer ends of said shanks and having said arms extending therethrough in a direction perpendicular to said shanks whereby when the handle member is shifted in one direction said collars slide therealong and the cover is swung in the direction of opening.

3. A receptacle comprising a body portion having a hinged cover, a handle member including a pair of arms pivotally connected to the sides of said body portion, and swivel connections upon said cover, said arms being adapted to have a sliding engagement with said connections whereby when said handle member is moved in one direction upon its pivot the cover will be shifted to another position.

In testimony whereof I affix my signature in the presence of two witnesses.

PAUL KANIZSAI.

Witnesses:
A. METZNER,
M. FENN.

Copies of this patent may be obtained for five cents each, by addressing the "Commissioner of Patents, Washington, D. C."